United States Patent
Yu

(10) Patent No.: US 9,538,379 B2
(45) Date of Patent: Jan. 3, 2017

(54) METHOD FOR AUTHENTICATION BETWEEN SMART CAR AND SMART HOME AND TELEMATICS SERVICE CENTER THEREFOR

(71) Applicant: Hyundai Motor Company, Seoul (KR)

(72) Inventor: Kanghi Yu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/740,740

(22) Filed: Jun. 16, 2015

(65) Prior Publication Data

US 2016/0174073 A1    Jun. 16, 2016

(30) Foreign Application Priority Data

Dec. 11, 2014 (KR) ........................ 10-2014-0178379

(51) Int. Cl.
| | |
|---|---|
| *H04M 9/00* | (2006.01) |
| *H04W 12/06* | (2009.01) |
| *H04W 60/00* | (2009.01) |
| *H04W 4/02* | (2009.01) |
| *H04L 29/06* | (2006.01) |
| *H04L 12/28* | (2006.01) |
| *H04L 29/08* | (2006.01) |

(52) U.S. Cl.
CPC .......... *H04W 12/06* (2013.01); *H04L 63/0869* (2013.01); *H04L 63/0884* (2013.01); *H04W 4/02* (2013.01); *H04W 60/00* (2013.01); *H04L 12/28* (2013.01); *H04L 67/12* (2013.01)

(58) Field of Classification Search
CPC ....................................................... H04M 9/00
USPC ............................................................ 455/457
See application file for complete search history.

(56) References Cited

U.S. PATENT DOCUMENTS

| | | | |
|---|---|---|---|
| 9,092,822 B2* | 7/2015 | Harris | G06Q 30/00 |
| 2007/0156881 A1* | 7/2007 | Nou | G07C 5/008 |
| | | | 709/223 |

FOREIGN PATENT DOCUMENTS

| | | |
|---|---|---|
| KR | 10-0646710 B1 | 11/2006 |
| KR | 10-2007-0072687 A | 7/2007 |

* cited by examiner

*Primary Examiner* — Charles Appiah
*Assistant Examiner* — Randy Peaches
(74) *Attorney, Agent, or Firm* — Mintz Levin Cohn Ferris Glovsky and Popeo, P.C.; Peter F. Corless

(57) ABSTRACT

A method for authentication between a smart car and a smart home includes: sending, by a telematics terminal of the smart car, a request for authentication of the telematics terminal to a telematics service center using a position of the smart car and a telephone number of the telematics terminal, wherein a car number of the smart car corresponds to the telephone number of the telematics terminal; checking, by a telematics service center, registration information about whether a smart home near the position of the smart car is registered in a smart home center; and authenticating, by the telematics terminal, the registration information received from the telematics service center through the telematics service center to the smart home center.

14 Claims, 2 Drawing Sheets

METHOD FOR AUTHENTICATION BETWEEN SMART CAR AND SMART HOME AND TELEMATICS SERVICE CENTER THEREFOR

CROSS-REFERENCE TO RELATED APPLICATION

This application claims priority to and the benefit of Korean Patent Application No. 10-2014-0178379 filed in the Korean Intellectual Property Office on Dec. 11, 2014, the entire contents of which are incorporated herein by reference.

BACKGROUND OF THE DISCLOSURE (a) Technical Field

The present disclosure relates generally to an authentication-related technique between a smart car and a smart home, and more particularly, to authentication between a smart car and a smart home, and a telematics service center therefor.

(b) Description of the Related Art

"Telematics" refers to a vehicular wireless Internet service in which a vehicle and wireless communication are combined together. Telematics is a compound word made of "telecommunication" and "informatics." It can be referred to as "automotive telematics" in that it uses an automotive Personal Computer (PC) to enable various Internet-based functionality in the vehicle, such as email and Internet searching.

Generally, telematics services are provided through collaboration between a car maker and a mobile communication service provider. Depending on the type of service, various functions are enabled, such as reception of news, investment in stocks, e-commerce, financial transactions, hotel reservations, transmission and reception of facsimiles, games, car accident reporting, and car theft reporting.

Using telematics communication, a car may be controlled using wireless communication between the car and a separate server. New service and control can be realized in such a way that a smart card can be installed in a car and store information about the car. In this regard, the smart card may be in communication with a server, and controller area network (CAN) communication for enabling respective parts of the car to operate in conjunction with one another can be combined with the former communication.

A telematics system for a vehicle provides various safety- and convenience-related functions, such as detecting the occurrence of a vehicle accident or theft, guiding a vehicle driving path, and tracking the vehicle's position, as well as providing a vehicle driver with a range of useful information using mobile communication techniques. Furthermore, a telematics system often provides information through a vehicle based on a global positioning system (GPS) using a mobile communication system and a GPS satellite. Accordingly, a telematics system can provide the vehicle driver with location-based services, such as traffic information, countermeasures to an emergency situation, remote vehicle diagnosis, use of the Internet (e.g., financial transaction, provision of news, and transmission and reception of e-mail) using the GPS, a wireless communication network, and/or an Internet network.

Additionally, telematics systems have been combined with various conventional systems. For instance, a home telematics system is essentially a telematics system combined with a home network system. The home network system is capable of remotely checking or controlling status of a light, a gas valve, a door, and a heater/air conditioner within a home, using a mobile communication network.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide a method for authentication between a smart car and a smart home and a telematics service center thereof which are capable of conveniently and safely executing mutual authentication between the smart home and the smart car that include a telematics terminal.

According to embodiments of the present disclosure, a method for authentication between a smart car and a smart home includes: sending, by a telematics terminal of the smart car, a request for authentication of the telematics terminal to a telematics service center using a position of the smart car and a telephone number of the telematics terminal, wherein a car number of the smart car corresponds to the telephone number of the telematics terminal; checking, by a telematics service center, registration information about whether a smart home near the position of the smart car is registered in a smart home center; and authenticating, by the telematics terminal, the registration information received from the telematics service center through the telematics service center to the smart home center.

The method may further include measuring, by the telematics terminal, the position of the smart car by executing a smart home application.

The smart home application may automatically generate the position of the smart car and the telephone number of the telematics terminal. The registration information may indicate one or more of a name, a building number, and a number of an apartment complex, associated with the smart home.

The method may further include receiving, at the telematics service center, name and position information of an apartment complex associated with the smart home from the smart home center; and storing, by the telematics service center, the name and position information of the apartment complex.

The method may further include storing, by the telematics service center, an authentication result between the telematics terminal and the smart home center in a mutual authentication system.

The checking of the registration information may include extracting, by the telematics service center, the smart home based on the position of the smart car, and extracting, by the telematics service center, the car number of the smart car based on the telephone number of the telematics terminal.

The method may further include transmitting, by the telematics service center, a list of smart homes near the position of the smart car to the telematics terminal so that smart home information is included in the registration information by the telematics terminal, when the smart home information including the car number of the smart car is not included in the registration information.

Furthermore, according to embodiments of the present disclosure, A telematics service center for authentication between a smart car and a smart home includes: a receiver which receives a position of the smart car and a telephone number of a telematics terminal of the smart car from the telematics terminal, wherein a car number of the smart car corresponds to the telephone number of the telematics terminal; a controller which checks registration information about whether a smart home near the position of the smart car is registered in a smart home center; and a transmitter which transmits the registration information to the smart home center.

The position of the smart car may be measured by a smart home application installed in the telematics terminal. The smart home application may automatically generate the position of the smart car and the telephone number of the telematics terminal. The registration information may indicate one or more of a name, a building number, and a number of an apartment complex, associated with the smart home.

The telematics service center may receive name and position information of an apartment complex associated with the smart home from the smart home center, and store the name and position information of the apartment complex.

The telematics service center may store an authentication result between the telematics terminal and the smart home center in a mutual authentication system.

The telematics service center may extract the smart home based on the position of the smart car and extract the car number of the smart car based on the telephone number of the telematics terminal.

The telematics service center may transmit a list of smart homes near the position of the smart car to the telematics terminal so that the smart home information is included in the registration information by the telematics terminal, when smart home information including the car number of the smart car is not included in the registration information.

According to the present disclosure, in a link service between a smart car and a smart home, the method for authentication between the smart car and the smart home and the telematics service center therefor may provide an automatic, convenient, and accurate mutual authentication method to a driver or a user of the smart car.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

Figure 1:
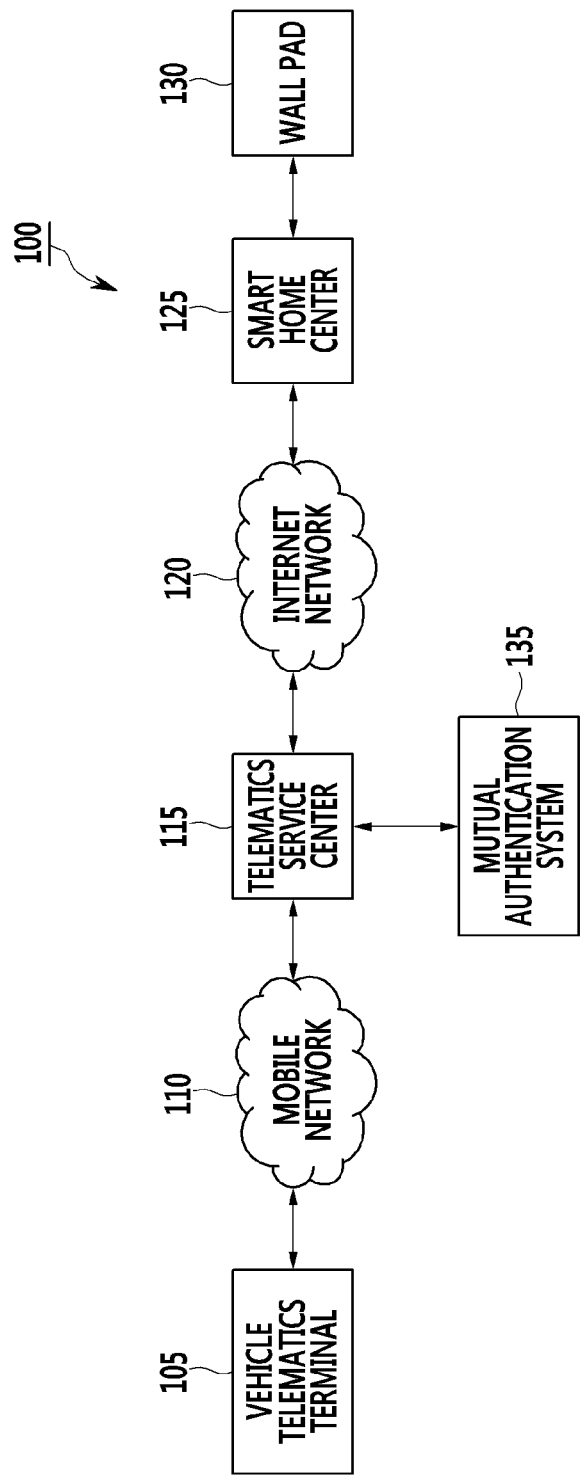
FIG. 1 is a diagram for describing an authentication system between a smart home system and a smart car system according to embodiments of the present disclosure.

Hereinafter, the present disclosure will be described in detail by describing embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components. In order to sufficiently understand the present disclosure and the object achieved by embodying the present disclosure, the accompanying drawings illustrating embodiments of the present disclosure and contents described in the accompanying drawings are to be referenced.

Terms used in the present specification are only used in order to describe embodiments rather than limiting the present disclosure. Singular forms are to include plural forms unless the context clearly indicates otherwise. It will be further understood that the terms "include" or "have" used in the present specification specify the presence of features, numerals, steps, operations, components, parts mentioned in the present specification, or a combination thereof, but do not preclude the presence or addition of one or more other features, numerals, steps, operations, components, parts, or a combination thereof. As used herein, the singular forms "a", "an" and "the" are intended to include the plural forms as well, unless the context clearly indicates otherwise. Furthermore, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

In general, a link service between a smart car and a smart home, the smart car and the smart home have different authentication systems, and thus a mutual authentication system between the smart car and the smart home may be necessary. However, an identification (ID) system and an authentication system of the smart car are different from those of the smart home. Accordingly, it may be difficult to operate the mutual authentication system.

The smart home may include information about a name, a building number, and a number of an apartment complex, associated with the smart home, and information about a vehicle number. The smart car may include information about a telephone number of a telematics terminal.

There are various technologies regarding a link service between a smart car and a smart home system (i.e., a home network). But mutual authentication between a smart car and a smart home system completely depends on key input of a user. For example, conventional mutual authentication techniques may determine the validity of the authentication only through a password check in a service request time, thus causing inconvenience for the user.

To this point, in a typical first scenario regarding conventional approaches to authentication, a user who is a client may manually input authentication information. However, inconvenience in use, problem of service failure due to erroneous input, or violation of another's right by the user may be present. In a typical second scenario regarding conventional approaches to authentication, a call center agent may be used. However, inconveniences such as a counseling center's operating costs, personnel expenses of the agent, or misrepresentation according to oral delivery on a call may be present.

Referring now to the presently disclosed embodiments, FIG. 1 is a diagram describing an authentication system between a smart home system and a smart car system according to embodiments of the present disclosure. The authentication system 100 between the smart home system and the smart car system may be a linkage service between a smart home and a smart car, and may be applied to an authentication method via interworking between the smart home and the smart car. The linkage service may include a service for notifying an emergency situation of the smart car to the smart home, a service for notifying an emergency situation of the smart home to the smart car, and a service for controlling a device (e.g., lighting equipment) in the smart home automatically when the smart car enters or exits from the smart home.

As shown in FIG. 1, the authentication system 100 between the smart home and the smart car may enable an initial authentication between the smart car and the smart home based on position information of a vehicle telematics terminal 105 and position information of the smart home including a wall pad 130, simply by a user executing a smart home application in the smart car which may be parked at the smart home (e.g., an apartment). The authentication system 100 may include an automated initial authentication process that does not have a key input or a call with a call center (or a service call center), simply by the user checking whether or not automated authentication information is correct.

The authentication system 100 includes the vehicle telematics terminal 105 included in the smart car, a telematics service center 115, a smart home center 125 included in the smart home system, the wall pad 130, and a mutual authentication system 135. The telematics service center 115 may be implemented as a server. The smart home center 125 may be implemented as a server to provide a smart home service and remotely control the smart home.

The vehicle telematics terminal 105 and the telematics service center 115 may be connected to each other through a mobile communication network 110. The telematics service center 115 and the smart home center 125 may be connected to each other through an Internet network 120. Telematics may utilize information acquired by a global positioning system (GPS) and a geographic information system (GIS) installed in the smart car to provide various mobile services such as traffic information, a countermeasure against an emergency, remote vehicle diagnosis, use of the Internet, and the like, to a driver and/or a passenger. The telematics terminal 105 may include input and output devices such as a microphone and a speaker for functions such as a speech recognition function, a text-to-speech (TTS) function, and the like, a liquid crystal display (LCD), a keyboard, and a touch screen. Telematics can allow for controlling the smart car at a remote distance, while the telematics terminal 105, which is mounted in the smart car, transmits position and state information of the smart car to the telematics service center 115 (a server positioned at a remote place), so that an owner or a driver of the smart car acquires the information via the server using his/her terminal. In addition, the telematics technology may provide an environment in which a user may transmit a remote control command by using his/her terminal. Thus, telematics may be used to prevent theft of the vehicle, manage a rental car, or build a vehicle controlling system.

The smart car including the telematics terminal 105 may use next generation electronic technology, information and communication technology, or control function technology associated with an automobile technology, and thus recognize internal and external conditions of the car in real time. Accordingly, the smart car may indicate a human-friendly car which may provide high safety and high convenience features.

The smart home including the wall pad 130 may be a system that connects all appliances in the home such as a TV, a refrigerator, and the like, and a mobile device such as a smart phone to a dedicated server. The appliances, the mobile device, and the dedicated server may be connected through a single application with one another. The wall pad 130, which may be attached to the wall of the smart home and be a touch screen type of terminal attached to a living room wall or a kitchen wall, may indicate a system that provides functions of a home network through a thin film transistor liquid crystal display (TFT LCD).

The authentication system 100 may provide mutual authentication between the smart home and the smart car by using a position or a current position measured value of the smart car including the telematics terminal 105 and a position (e.g., address) of the smart home or a smart home complex. The smart home may include smart home information such as a name, a building number, and a number of an apartment complex, and information about a car number of the smart car. The telematics terminal 105 may include phone number information of the telematics terminal.

Figure 2:
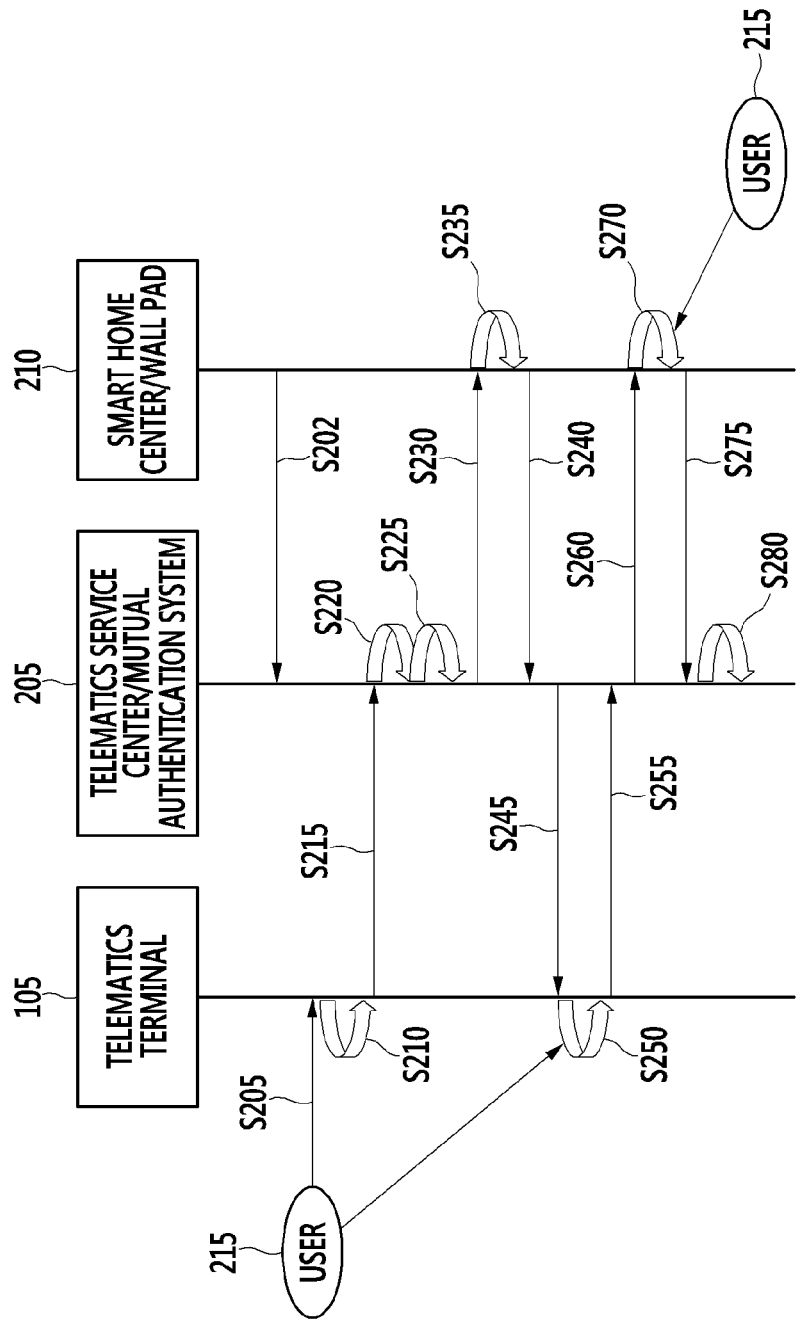
FIG. 2 is a diagram for describing an authentication method between a smart car and a smart home according to embodiments of the present disclosure.

FIG. 2 is a diagram describing an authentication method between a smart car and a smart home according to embodiments of the present disclosure. The authentication method between the smart car and the smart home may be applied to the authentication system 100 shown in FIG. 1.

As shown in FIG. 1 and FIG. 2, a user 215 may register or store smart home information or smart home complex information such as an apartment complex name, a position of the complex (e.g., address of the complex), etc. in the wall pad 130 that is included in a smart home system 210 and is disposed in the smart home, in advance. Then, the wall pad 130 may transmit smart home information to the smart home center 125 of the smart home system 210. The smart home center 125 may transmit the received smart home information to the telematics service center 115 included in a telematics service system 205 via the internet network 120 in step S202.

The user 215 may execute or operate a smart home application in the telematics terminal 105 of the smart car that may be parked or positioned at the smart home or the smart home complex in step S205.

The telematics terminal 105 may execute the smart home application to measure position or current position information of the smart car in step S210. The telematics terminal 105 may measure a position of the smart car by including a global positioning system (GPS) receiver.

When there was no authentication between the smart car and the smart home previously, the executed application may use position information or current position coordinate information on the smart car and telephone number of the telematics terminal 105 to transmit information that requests authentication to the telematics service center 115 in step S215. The position information of the smart car and the telephone number of the telematics terminal 105 may be information that is automatically generated in the telematics terminal 105 of the smart car and not a value inputted to the telematics terminal 105 by the user who is a client.

The telematics service center 115 may extract or query a smart home list or a smart home complex list which is close to position of the smart car among smart homes or smart home complexes that are service objects in a service subscription information database or a storage unit of the telematics service center 115 based on a position or coordinate position of the smart car in step S220. The smart home list may be, for example, smart homes at a distance of 100 m from a position of the smart car. In addition, the telematics service center 115 may extract or check a car number of the smart car in the database in step S225.

The telematics service center 115 may inquire of the smart home center 125 whether the smart home which includes the car number of the smart car and is close to a position of the smart car is registered or stored in the smart home center 125 in step S230. More specifically, the telematics service center 115 may check or request registration information about whether or not the smart home or the smart home list near the position which includes the car number of the smart car corresponding to the telephone number of the telematics terminal 105 is registered or stored in the smart home center 125 to the smart home center 125. The registration information may include one or more of a name, a building number, and a number of an apartment complex, associated with the smart home. The telematics service center 115 may use the position of the smart car to extract the smart home or the smart home list in the vicinity of the position, and use the telephone number of the telematics terminal 105 to extract the car number of the smart car.

The smart home center 125, in response to a request or a query request, may search smart home information (e.g., a building number and a house number of an apartment) having the car number of the smart car in a database included in the smart home center 125 in step S235.

The smart home center 125 may return or transmit information about whether the smart car is a registered car and the smart home information (e.g., a building number and a house number of an apartment) that is search result information to the telematics service center (115) in step S240.

When there are registered contents that are a result according to request of the telematics service center 115, the telematics service center 115 may provide or transmit the smart home information such as a name, a building number, and a house number of an apartment complex and the car number of the smart car to the telematics terminal 105 via the mobile network 110. When there are no registered contents, the telematics service center 115 may provide a smart home list or a smart home complex list near the position of the smart car to the telematics terminal 105 in step S245.

The telematics terminal 105 may display registration information of the smart home or smart home information to the user 215 that is a client. Then, the user 215 may confirm whether the registration information is correct. When the smart home information (e.g., a name, a building number, and a number of an apartment complex) is correct, the user 215 may click a request message for authentication confirmation that is displayed on a screen of the telematics terminal 105. Then, an authentication process may be carried out automatically. When correct smart home information does not exist, in a state in which the smart home list is provided to the user 215, the user 215 may directly or semi-automatically input smart home information that needs to be registered. More specifically, when the registration information does not include smart home information including the car number of the smart car, the telematics service center 115 may transmit the smart home list in the vicinity of the position so that the registration information includes the smart home information by the telematics terminal 105.

The telematics terminal 105 may request authentication about the smart home information (e.g., a name, a building number, and a house number of an apartment complex) that the user 215 selects, from the telematics service center 115 in step S255.

The telematics service center 115 may request authentication about the smart home information such as the name, the building number, and the house number of the apartment complex, the car number of the smart car, the telephone number of the telematics terminal 105, from the smart home center 125 in step S260.

The smart home system 210 may output and display authentication information requested to the wall pad 130. Then, the user 215 may confirm the authentication information including the smart car information such as the car number of the smart car. As a result, mutual authentication between the smart car and the smart home may be performed in step S270. Furthermore, the user 215 may confirm the smart car information through the telematics terminal 105 receiving the authentication information from the wall pad 130. The telematics terminal 105, as shown in FIG. 1, may be connected to the wall pad 130 via the telematics service center 115. In another embodiment of the present disclosure, the telematics terminal 105 may be connected to the wall pad 130 through a communication network (e.g., Wi-Fi networks).

The smart home center 125 may notify authentication result information to the telematics service center 115 in step S275.

The telematics service center 115 may store mutual authentication results between the telematics terminal 105 and the smart home center 125 in the mutual authentication system or the mutual authentication device 135 included in the telematics service system 205 in step S280.

Automated mutual authentication is completed by the above-described operation or the above-described step, and then a link service between the smart home and the smart car may be started. After the mutual authentication is completed, authentication may not be necessary when the service between the smart car system and the smart home system is performed.

Embodiments of the telematics service center 115 for authentication between the smart car and the smart home are described as follows with reference to FIGS. 1 and 2.

The telematics service center 115 may include a receiver, a controller, and a transmitter. The receiver may receive a position of the smart car which may be located at the smart home and a telephone number of the telematics terminal 105 from the telematics terminal 105 of the smart car.

The controller may check or request registration information about whether or not the smart home or a smart home list in the vicinity of the position which includes a car number of the smart car corresponding to the telephone number of the telematics terminal 105 is registered or stored in the smart home center 125 from the smart home center 125. The controller may be configured to perform a function of a central processing unit (CPU) or a processor and may control the entire operation of the receiver and the transmitter. The controller may include a program including a series of instructions for performing the method for authentication between the smart car and the smart home according to the present disclosure.

The transmitter may transmit the registration information to the smart home center 125 or transmit the registration information confirmed by the smart home center 125 to the telematics terminal 105. The position of the smart car may be measured by a smart home application installed or mounted in the telematics terminal 105. The smart home application may automatically generate the position and the telephone number of the telematics terminal 105. The registration information may include a name, a building number, and a house number of an apartment complex included in the smart home.

The telematics service center 125 may receive name and position information of an apartment complex included in the smart home from the smart home center 125, and store or register the name and position information of the apartment complex. The telematics service center 125 may store an authentication result between the telematics terminal 105 and the smart home center 125 in the mutual authentication system 135. The telematics service center 125 may extract the smart home or the smart home list near the position by using the position of the smart car, and extract the car number of the smart car by using the telephone number of the telematics terminal 105.

When smart home information including the car number of the smart car is not included in the registration information, the telematics service center 125 may transmit a smart home list near the position so that the smart home information is included in the registration information by the telematics terminal 105.

The components, or "~unit", or block, or module, or the like, as are used herein may be implemented in software such as a task, a class, a subroutine, a process, an object, an execution thread, or a program which is performed in a predetermined region on the memory, or hardware such as a field programmable gate array (FPGA) or an application-specific integrated circuit (ASIC), and may be performed in a combination of the software and the hardware. The components, '~part', or the like may be embedded in a computer-readable storage medium, and some thereof may be dispersedly distributed in a plurality of computers.

As set forth above, embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and embodiments are possible from the present disclosure. Accordingly, the actual technical protection scope of the present disclosure must be determined by the spirit of the appended claims.

DESCRIPTION OF SYMBOLS

105: vehicle telematics terminal
115: telematics service center
125: smart home center
130: wall pad
135: mutual authentication system

What is claimed is:

1. A method for authentication between a smart car and a smart home, comprising:
    sending, by a telematics terminal of the smart car, a request for authentication of the telematics terminal to a telematics service center using a position of the smart car and a telephone number of the telematics terminal, wherein a car number of the smart car corresponds to the telephone number of the telematics terminal;
    checking, by a telematics service center, registration information about whether a smart home near the position of the smart car is registered in a smart home center;
    transmitting, by the telematics service center, a list of smart homes near the position of the smart car to the telematics terminal so that smart home information is included in the registration information by the telematics terminal, when the smart home near the position of the smart car is not registered in the smart home center; and
    authenticating, by the telematics terminal, the registration information received from the telematics service center through the telematics service center to the smart home center.

2. The method of claim 1, further comprising:
    measuring, by the telematics terminal, the position of the smart car by executing a smart home application.

3. The method of claim 2, wherein the smart home application automatically generates the position of the smart car and the telephone number of the telematics terminal.

4. The method of claim 1, wherein the registration information indicates one or more of a name, a building number, and a number of an apartment complex, associated with the smart home.

5. The method of claim 1, further comprising:
    receiving, at the telematics service center, name and position information of an apartment complex associated with the smart home from the smart home center; and
    storing, by the telematics service center, the name and position information of the apartment complex.

6. The method of claim 1, further comprising:
    storing, by the telematics service center, an authentication result between the telematics terminal and the smart home center in a mutual authentication system.

7. The method of claim 1, wherein the checking of the registration information comprises:
    extracting, by the telematics service center, the smart home based on the position of the smart car; and
    extracting, by the telematics service center, the car number of the smart car based on the telephone number of the telematics terminal.

8. A telematics service center for authentication between a smart car and a smart home, comprising:
    a receiver which receives a position of the smart car and a telephone number of a telematics terminal of the smart car from the telematics terminal, wherein a car number of the smart car corresponds to the telephone number of the telematics terminal;
    a controller which checks registration information about whether a smart home near the position of the smart car is registered in a smart home center and which transmits a list of smart homes near the position of the smart car to the telematics terminal so that smart home information is included in the registration information by the telematics terminal, when the smart home near the position of the smart car is not registered in the smart home center; and a transmitter which transmits the registration information to the smart home center.

9. The telematics service center of claim 8, wherein the position of the smart car is measured by a smart home application installed in the telematics terminal.

10. The telematics service center of claim 9, wherein the smart home application automatically generates the position of the smart car and the telephone number of the telematics terminal.

11. The telematics service center of claim 8, wherein the registration information indicates one or more of a name, a building number, and a number of an apartment complex, associated with the smart home.

12. The telematics service center of claim 8, wherein the telematics service center receives name and position information of an apartment complex associated with the smart home from the smart home center and stores the name and position information of the apartment complex.

13. The telematics service center of claim 8, wherein the telematics service center stores an authentication result between the telematics terminal and the smart home center in a mutual authentication system.

14. The telematics service center of claim 8, wherein the telematics service center extracts the smart home based on the position of the smart car and extracts the car number of the smart car based on the telephone number of the telematics terminal.

* * * * *